Jan. 10, 1956   A. A. WHITING, JR., ET AL   2,730,402
CONTROLLABLE DISPERSAL DEVICE
Filed Sept. 30, 1953

INVENTORS
ARTHUR A. WHITING, JR.
RICHARD J. TRUDELL
HARRY L. GLASS

BY
ATTORNEYS

United States Patent Office 2,730,402
Patented Jan. 10, 1956

2,730,402

CONTROLLABLE DISPERSAL DEVICE

Arthur A. Whiting, Jr., Williamsville, Richard J. Trudell, Akron, and Harry L. Glass, Lancaster, N. Y., assignors, by mesne assignments, to the United States of America as represented by the Secretary of the Navy Application September 30, 1953, Serial No. 383,423

6 Claims. (Cl. 299—30)

The invention described herein may be manufactured and used by or for the Government of the United States of America for governmental purposes without the payment of any royalties thereon or therefor.

This invention relates to spray dispersion apparatus for liquids as applicable for use with aircraft.

Liquid dispersion apparatus on aircraft is in common use for insect control. A deficiency of the usual dispersion device lies in the fact that, while the volume of liquid sprayed may readily be controlled by the operator, the size of the emitted droplets is fixed by the dimensions of the air mixing device, or is subject only to chance factors such as liquid viscosity or speed of aircraft movement.

An important object of the present invention is to provide an airborne spray unit which permits easy control over the size of the emitted droplets. An object, also, is to provide spray control for droplet size which may be manipulated while the apparatus is airborne. Still another object is to provide in spray apparatus liquid valve means automatically adjustable in portal opening to the valve pressure, and, to some degree, to the speed of air movement through the device.

Other objects of the invention, as well as various other novel features and advantages, will become apparent on examination of the following description and accompanying drawings, in which:

Fig. 1 is a view of the device as attached to an airplane;

Fig. 2 is a vertical axial section through the device showing the valve adjustment mechanism;

Fig. 3 is a detail showing the air valve guide as taken along lines 3—3 of Fig. 2;

Fig. 4 is a detail showing the bearing support taken along lines 4—4 of Fig. 2;

Fig. 5 is a detail showing the slidable tube guide taken along lines 5—5 of Fig. 2;

Fig. 6 is a detail showing the set-screw adjustment for the movable shaft as taken along lines 6—6 of Fig. 2; and Fig. 7 is a sectional view of a modified device showing lever mechanism for valve adjustment while the equipment is airborne.

The dispersal device takes the broad form of a tubular unit 10 adapted for suspension by brackets 11 beneath air craft 12, as shown in Fig. 1 so that the passageway through the unit is parallel to the airstream. The structure includes a tubular casing 13 which is preferably cylindrical with a straight forward edge section 14 and a conically divergent rear edge section 15. A tube 16 is mounted in the forward end of casing 13. This tube is of cylindrical cross section but is curved in an axial direction to form a constriction toward the rear from the mid-point thereof, the tube from this constriction flaring outwardly at both ends, the fore end extending reversely over the fore edge of casing 13 and attached thereto. The rear end of tube 16 is enclosed by a flexible annular plate 20, such as brass, having radial

2 cuts forming blades 21 adapted to bend out under pressure as shown in broken lines. This plate is secured to the casing 13 as shown by screws 9. The annular space 22 between the tube 16 and casing thus forms a manifold for distribution of mixed insecticide and oil as received from an appropriate tank source through inlet opening 23.

The tube 16 constitutes a throat inlet for air flow. To control this air flow two valves are employed, an inlet valve 25 positioned axially in the throat 16 and an outlet valve 26 positioned axially in the conical end section 15. To support these valves a spider 28 having radial plate arms 29, 30 and 31 is provided, the outer arm ends being turned and fastened, as by rivets 32, to the casing wall and the inner arm ends merging with a hollow cylindrical hub 33 axially placed in the casing. Spider plate 31 is forwardly elongated along the casing axis to form a restraining stop 34 as will be explained hereinafter.

A rod 35, having a smooth central section 36 is positioned in the spider hub with the smooth section confined by said hub. Forward of the hub the rod is left-hand threaded and has threaded engagement with an internally threaded axially placed tube 37 formed in the inlet valve 25, the rod length of projection from the hub being such as to hold the inlet valve in adjacency to the constricted end sections of the throat 16. The valve 25 has an obtuse point 40 which expands rearwardly and concavely to a rear edge forming a circular valve base with a diameter exceeding the diameter of the throat at its constricted section. Thus forward movement of the valve will move it toward the throat wall to reduce the valve opening. In order to prevent valve rotation on the threaded rod, a grooved end 41 is formed on the valve tube 37 to receive slidably the stop 34 (Fig. 3). To hold the rod 35 from axial displacement the rod, rearwardly of the hub, is made of larger diameter and a nut 39 is threaded on the forward side of the rod and fixed thereto.

The rear central rod surface carries a right-hand thread. An internally threaded support tube 50 is mounted for axial movement on this rear threaded section, the tube surface being axially grooved to receive the end of a retractable bolt 51 secured by screw threads 52 to the casing wall. By rotating the bolt head 53 the bolt end may be lowered into the groove of tube 50 or lifted free of the groove to permit rotation of the tube 50 (Fig. 5).

Adjacent the rear end of tube 50 is a radial flange 54 to which the valve member 26 is attached as by rivets 55. This valve is shaped as the frustum of a cone with the wall inclination parallel to the flared end edge 15 of the casing. Since the supporting rod is axially positioned in the casing it is apparent that on rotation of the rod, valve 26 will also move axially to open or close the valve opening as determined by the direction of rod rotation. The rod 35 extends rearwardly of the support tube 50, terminating in a knurled thumb head 57 for rod adjustment. A set-screw 58, as inserted at the rear end of tube 50, serves to lock the rod in a desired position (Fig. 6).

It will now be apparent that the two valves 25 and 26 bound a central mixing chamber 55 within the casing at the fore end of which the fluid dispersal agent is received together, when in use, with a current of air which mechanically agitates the fluid mass and delivers it as a spray aft of valve 26.

In use, bolt 51 is first released from holding engagement with the groove of hub 50 and valve 25 moved to secure the desired inlet valve opening. Valve 26 is then adjusted to a degree giving a larger exit opening than the inlet opening of valve 25. In flight, the air passes at high velocity through the venturi-like annular opening of valve 25 and breaks the liquid into a spray of fine droplets which mix with the air in the casing chamber 55 and pass out through valve 26. If the droplet size is too large the thumb piece 57 is rotated to move valve 25 to a reduced opening and valve 26 to an increased opening. The decreased inlet valve opening of itself increases the velocity of air flow past the liquid gate, but this velocity is still further increased by reduction in pressure in the casing chamber through the increased opening of outlet valve 26. In this way the droplet size, which varies inversely with speed of air flow, is controlled.

Figure 1:
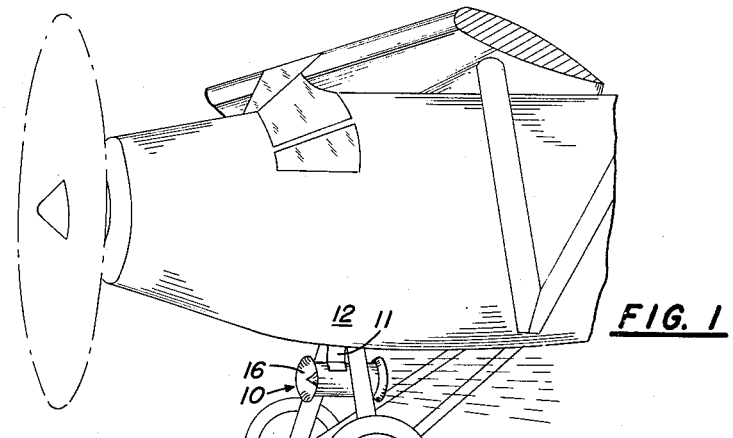
Figure 2:
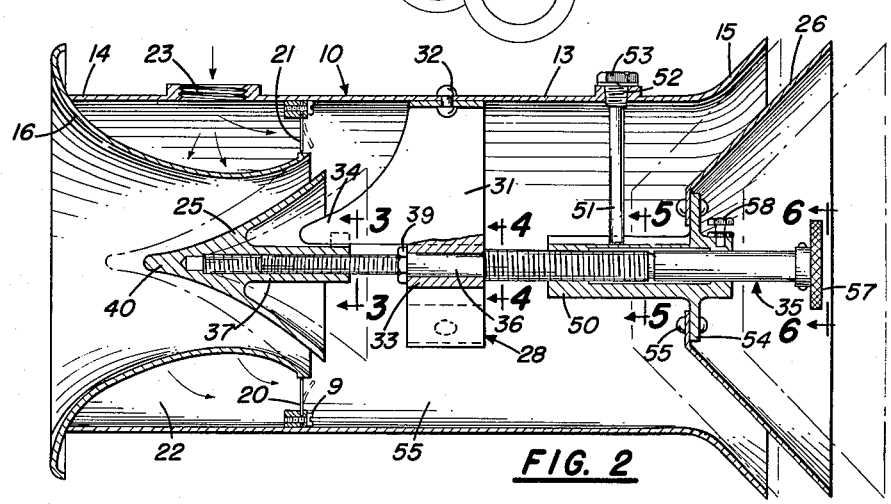
Figure 3:
Figure 4:
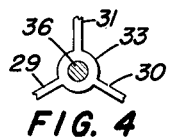
Figure 5:
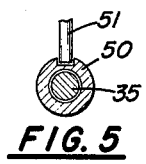
Figure 6:
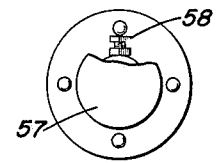
Figure 7:
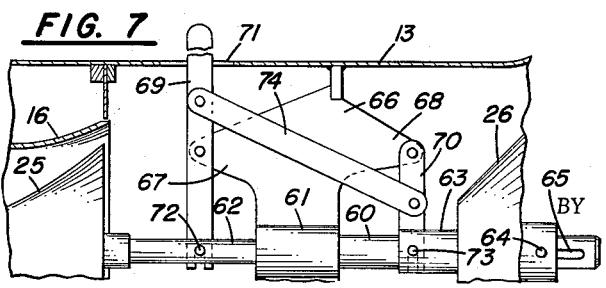

In the preferred form a set valvular adjustment is predetermined before flight. In some instances, however, it may be desirable to adjust the droplet size of the spray during flight, and mechanism for accomplishing this result is shown in Fig. 7. In this modification, a fixed tube 60 is secured within the bore of the spider hub 61 and extends rearwardly thereof to a point adjacent the casing end. The rod 62, corresponding to rod 35 of Fig. 2, is mounted for slidable movement in this fixed tube 60. The forward rod end is fixed to the valve 25 and the rear end extends to the rear end of fixed tube 60.

Mounted on tube 60 is a slidable sleeve 63, to which is attached the outlet valve 26. A pin 64 secures the valve 25 to the slidable sleeve 63, the pin passing through slots 65 formed in the fixed tube 60 and slide rod 62 for limitation of relative axial movement of the slidable members.

The spider plate 66 has fore and aft extensions, 67 and 68 respectively, these extensions carrying operating links 69 and 70 thereon. Link 69 is pivoted near its center and the upper or outer end extends through slot 71 in the casing wall to a point without the casing for connection to appropriate operating linkage. The inner link end is bifurcated to engage a pin 72 in the slide rod. Link 70 is pivoted at one end to the rear extension 68 the other end being also bifurcated to engage pin 73 in the slidable sleeve 63. A cross link 74 is pivotally connected to link 69 above the support extension 67 and to link 70 below support extension 68.

In use, if a reduction of droplet size is desired the external linkage is manipulated to move the protruding extension of link 69 rearwardly, thus closing valve 25 and opening valve 26. Thus, the velocity of air passage through valve 25 is increased and the pressure in the internal chamber is reduced, resulting in a reduction of droplet size.

Other modifications are possible in the light of the above disclosure and it is therefore to be understood that within the scope of the appended claims the invention may be practiced otherwise than as specifically described.

What is claimed is:

1. In spray dispersal apparatus, a tubular open-ended casing, an air intake throat at one end of said casing, an inlet air valve at said throat, an annular valve for spray liquid adjacent the periphery of said air valve, an outlet air valve at the other end of said casing, a mixing chamber between said air valves, a connection normally fixed but adjustable as to length between said air valves, and means for moving said connection to change the length and thereby the port openings to said chamber of both of said air valves.

2. The spray dispersal apparatus as defined in claim 1 including means for adjusting both air valves simultaneously and in opposite sense, whereby when the inlet valve is opened the outlet valve is closed.

3. The spray dispersal apparatus as defined in claim 2 with means for interrupting the action of said air valve adjustment means for independent actuation of said valves.

4. The spray dispersal apparatus of claim 1 including additionally a reservoir for liquid adjacent said annular valve, said annular valve having a resilient port member normally closed but movable to open position in accordance with the degree of pressure exerted by the liquid in said reservoir.

5. The spray dispersal apparatus as defined in claim 1 with said power means comprising a threaded shaft, an internally threaded tube member attached to each air valve and mounted in coacting engagement with said threaded shaft, and means for holding said air valves from rotation while permitting axial movement, whereby on rotation of said shaft both air valves are moved axially.

6. The spray dispersal apparatus as defined in claim 5 wherein the threads coacting with the air valve tube members are in opposite sense, whereby one of said air valves is moved to opened position while the other is moved to closed position.

References Cited in the file of this patent

UNITED STATES PATENTS

| | | |
|---|---|---|
| 2,048,847 | Desmet | July 28, 1936 |
| 2,473,212 | Monson | June 14, 1949 |